(12) United States Patent
Hackl et al.

(10) Patent No.: US 8,419,997 B2
(45) Date of Patent: Apr. 16, 2013

(54) METHOD AND DEVICE FOR INJECTION MOLDING PLASTIC MATERIAL

(75) Inventors: Manfred Hackl, Linz (AT); Klaus Feichtinger, Linz (AT); Gerhard Wendelin, Linz (AT)

(73) Assignee: EREMA Engineering Recycling Maschinen und Anlagen Gesellschaft m.b.H., Ansfelden (AT)

(*) Notice: Subject to any disclaimer, the term of this patent is extended or adjusted under 35 U.S.C. 154(b) by 0 days.

(21) Appl. No.: 12/867,369

(22) PCT Filed: Feb. 11, 2009

(86) PCT No.: PCT/AT2009/000052
§ 371 (c)(1),
(2), (4) Date: Nov. 18, 2010

(87) PCT Pub. No.: WO2009/100473
PCT Pub. Date: Aug. 20, 2009

(65) Prior Publication Data
US 2011/0049763 A1 Mar. 3, 2011

(30) Foreign Application Priority Data
Feb. 14, 2008 (AT) .................................. A 245/2008

(51) Int. Cl.
*B29B 13/10* (2006.01)
*B29C 45/18* (2006.01)

(52) U.S. Cl.
USPC ......... 264/328.17; 366/78; 425/197; 425/585

(58) Field of Classification Search ............. 264/328.17; 425/197, 202, 582, 585; 366/78
See application file for complete search history.

(56) References Cited

U.S. PATENT DOCUMENTS 2,382,655 A 8/1945 Nichols
3,163,693 A * 12/1964 Stenger .................... 264/328.17
3,572,647 A * 3/1971 Staheli ............................ 366/75

(Continued)

FOREIGN PATENT DOCUMENTS

DE 101 49 515 A1 4/2003
EP 0 321 742 A1 6/1989
EP 1 273 412 A1 1/2003
WO WO 2006/079128 A1 8/2006

OTHER PUBLICATIONS

Gotzmann, G., "Recycling without Intermediate Steps, Transfer Moulding—the Mild Processing Technique for Glass Fibre Reinforced Thermoplastics," *Kunststoffe plast europe*, vol. 86, No. 8, pp. 1126-1130 (Aug. 1, 1996).

*Primary Examiner* — Jill Heitbrink
(74) *Attorney, Agent, or Firm* — Kilpatrick Townsend & Stockton LLP

(57) ABSTRACT

The present invention relates to a method and to a device for injection molding plastic material, wherein the starting plastic material to be treated is first subjected to a pretreatment, wherein the plastic material is heated in a receiving container at a temperature below the melting temperature while constantly being mixed, and thereby at the same time is crystallized, dried and/or cleaned and/or the intrinsic viscosity thereof is increased. According to the invention, the plastic material pretreated in this way is transferred into a screw injection molding machine (10) having a screw (16) rotating in a housing (17) and being axially displaceable therein and/or acting as a piston, is plasticized in said screw, and molded into a molded part, for example a preform.

14 Claims, 1 Drawing Sheet

U.S. PATENT DOCUMENTS

| | | | |
|---|---|---|---|
| 4,222,728 A | 9/1980 | Bacher et al. | |
| 4,256,689 A * | 3/1981 | Gardner | 264/328.8 |
| 5,651,944 A * | 7/1997 | Schulz et al. | 366/85 |
| 5,988,865 A * | 11/1999 | Bacher et al. | 366/76.93 |
| 6,109,910 A * | 8/2000 | Sekido | 425/561 |
| 6,719,454 B1 * | 4/2004 | Bacher et al. | 366/314 |
| 7,291,001 B2 * | 11/2007 | Bacher et al. | 425/202 |
| 2009/0004325 A1 * | 1/2009 | Bacher et al. | 425/586 |

* cited by examiner

METHOD AND DEVICE FOR INJECTION MOLDING PLASTIC MATERIAL

CROSS-REFERENCES TO RELATED APPLICATIONS

This application is a National Stage of International Application No. PCT/AT2009/000052 filed Feb. 11, 2009, and which claims the benefit of Austrian Patent Application No. A 245/2008, filed Feb. 14, 2008, the disclosures of which are incorporated herein by reference.

BACKGROUND OF THE INVENTION

The invention relates to a procedure and a device for injection molding.

Probably injection molding is the most important procedure for manufacture of preforms. Roughly 60% of all plastic processing machines are injection molding machines, with 30% being extruders and 10% "exotics". Preforms weighing only a few milligrams up to 30 kg of shot are produced on injection molding devices.

Injection molding is above all suited to mass-produced products, since raw material (granulate) can be converted for the most part in one working pass into a completed part. Subsequent reworking is minor or can be dispensed with altogether and even complex geometries can be produced in a single working pass. In addition, many types of filler materials such as glass fibers, talcum, soot, metal shavings, pigments, polymeric additives, etc. can be included, thus making it possible to make specific modifications to the properties of the finished product.

The properties of a finished product are determined by the material used, the shaping and the type and implementation of the processing. With plastics, especially thermoplastics, these influences can be recognized in more pronounced fashion than with metals. The selection of the "right" plastic—partially crystalline or amorphous—as the material depends to a high degree on its molecular structure. In an injection molding process, almost exclusively thermoplastic polymers are processed. Thermoplastics consist of linear macromolecules, which are present in the completed part either in statically convoluted (amorphous), regularly arranged (crystalline), or stretched (oriented) form. In most cases, all three states are united in a completed part. Due to the relatively high molecular weight of all plastics, a 100% crystalline state is never achieved in the finished piece. In this connection, one speaks of a degree of crystallinity, which is a ratio of crystalline volume to overall volume. Usually the degree of crystallinity of preforms is between 50% and 80%, and along with material-specific properties, this depends primarily on the design (tool) and the processing parameters.

One additional important viewpoint for correct selection of the material is the subsequent temperature at which the completed part is to be used. Here especially, attention is to be paid to the glass transition temperature. Since some types of plastics have glass transition temperatures that are in the room-temperature range, the question of usage above or below the glass transition temperature can be very decisive, since in the area of the glass transition temperature, many mechanical properties can change "suddenly".

The most important processing parameters in injection molding are the mass temperature, the tool temperature, the form filling time and the injection volume and the pressure gradient in the tool (interior form pressure).

The form filling time and the pressure gradient in the tool are decisive in determining the process of form filling, and thus the mechanical properties of the finished part. Since most plastics shrink during the cooling process, to reach the sealing point (congealing of the shrinking head), shaped masses must be fed under dwell pressure. After the sealing point is reached, the dwell pressure is shut off. However, the preform still is in a dwell state for a certain time (residual cooling time) in the closed tool. During this residual cooling time, the preform temperature drops below the melt temperature and the glass transition temperature, so that when the completed part is ejected, deformation is prevented. The entire period of time from the start of tool filling until the next commencement is called the cycle time.

The mass and tool temperatures to be selected are tool-specific parameters, and therefore are pre-set or recommended in most cases by the plastics manufacturer. Due to them, the properties of the completed part can be influenced. Thus, for example, with PET, the tool temperature is very decisive for the crystal structure of the finished part: a low tool temperature causes quick cooling, and the finished part is amorphous and transparent. High tool temperature increases the degree of crystallinity and thus, for example, the mechanical properties of the preform. The usual mass temperatures in processing mass plastics like PP, PE, PS, ... are in the range from 220° to 280° C., with tool temperatures between 30° C. and 120° C. High-performance plastics (PEEK, PPS, LPSs, ...) require mass temperatures of up to 480° C. and tool temperatures of up to 200° C. Thermoplastic injection molding is the basis for all other injection molding procedures, and presently overall is the most frequently used plastic processing procedure.

Injection molding machines—including injection molding machines used in the present instance—generally consist of two pieces: the spraying and plastifier unit that prepares the plastic granulate and sprays it under pressure into the tool, and the enclosing unit, which receives the tool (also the form) and opens and closes it.

The core piece in the spraying unit is a worm-gear shaft, also called a worm, that extends in a cylinder or housing. The inner diameter of the cylinder is equal to the outer diameter of the worm. The cylinder is most commonly designated as the worm cylinder. In the rear area of the worm cylinder is a hopper into which the plastic granulate is filled. Through an opening (the filler block) the granulate trickles into the cylinder. Turned by a drive, the worm rotates in the worm cylinder and transports the granulate forwards. In thermoplastic injection molding, the worm cylinder is heated from without by means of electrical heater bands. Due to this heat and the special geometry of the worm, the granulate is not merely moved but also clipped; the plastic melts, plastifies and becomes homogenized. At the tip of the worm cylinder is a nozzle that forms the transition to the tool.

During the dosing process, the shape mass is mostly transported through a non-return valve to the nozzle, and accumulates in front of it. To offer sufficient retaining capacity for the shape mass, the work is impinged on only axially by a slight amount of pressure (banking-up pressure), so that it can shift in the direction of the filling hopper and thus forms the so-called worm outer chamber in which the mass volume is found. The banking-up pressure acts against the melt, so that the melt is compressed and does not pull the worm back. The pressure which the melt exerts moves the worm back.

With the injection process, the worm is pressed axially toward the nozzle, whereby the non-return valve is closed and thus the mass volume is sprayed through the nozzle into the tool.

The non-return valve is a component of the injection molder. Essentially it consists of a locking rink, a worm tip and a compression ring, and it sits at the tip of the dosing worm. The quality of the injection-molded part is decisively dependent on its function. During the injection process, the non-return valve prevents the molten material from flowing back into the worm passages. When dosing, it likewise makes it possible for material to flow from the worm area into the filler space. If the dosing worm is turned, then it feeds the plastic material through the opened non-return valve into the filler space and the worm moves backward in an axial direction until it reaches the set value. During injection, the worm is shifted forward by a hydraulic unit. Now the build-up and the locking ring close the path in the worm direction. The dosed material is now pressed into the injection molding form with no loss of pressure or amount.

After a part filling of 90% to 98%, a switchover is made to restoring compression. A mass must remain in the cylinder (residual mass filler), because otherwise the pressure cannot act on the mass. The restoring compression is necessary to compensate for the shrinkage in volume.

A three-zone worm is often used in thermoplastic processing. In the so-called intake zone, the plastic granulate is taken in and fed into the next zone, the compression zone, where the plastic is plastified and compressed (and degassed if necessary). After that, the melt is homogenized in the metering zone and finally compressed through the non-return valve in front of the worm, which moves axially backward as a result of increasing banking-up pressure.

Various procedures and devices for injection molding are known from prior art.

For example, from DE 198 03 422 A1 a procedure and a device are known for transfer molding of fiber-reinforced plastics.

The disclosed procedure makes provision for a plastic raw material such as comminuted or granulated plastic raw material to be passed to a plastifier device consisting of an extruder housing and an extruder worm that turns in the extruder housing about a longitudinal axis, and to plastify it in the plastifier device and feed it in the direction of an extrusion die. In the area of the plastifier device, fiber material is fed to the plastified plastic mass and mixed during further transport in the plastifier device with the plastified plastic mass. After this, the plastified mass containing fibers is fed to an injection device and injected by the injection device through an injection nozzle into an extrusion die formed from at least two pieces and then compressed into a formed body in the extrusion die. The plastic raw material in this case is fed to the extruder via a shredder, with additives being added if necessary to the raw material in the shredder.

The disclosed device for carrying out the procedure has a plastifying device with an extruder housing and an extruder worm placed so as to turn about a longitudinal axis in the extruder housing, a dosing device for fiber material, and an injection device with an injection cylinder, an injection piston and an injection nozzle as well as a compression mold tool with halves of the extruder die placed movably one on the other. Additionally, at the start of the extruder cylinder is a shredder, which comminutes the plastic raw material, heats it by tribological heat and feeds it to the extruder worm in the extruder cylinder.

This procedure and the device have thoroughly proven themselves, but they are not suitable for processing of plastic mixtures, especially mixtures with at least one polyester component, because polyesters in particular, close to their melting point, react in sensitive fashion to natural atmospheric moisture; i.e. the chain length of the molecules is shortened through hydrolytic breakdown, which results in disadvantageous changes in the material properties, such as reduced strength or altered color. Such a disadvantageous effect on material properties is not desired in the end product to be manufactured.

Other types of plastics such as polyamides are in danger of oxidation at or near their melting point, which also entails the above-mentioned disadvantages in regard to the properties of the material or end product.

To avoid these disadvantages, a device is known from EP 390 873 for preparation of thermoplastic material. This device comprises a receiving container that at the top can be closed by a sluice to be at least essentially gas-tight for plastic material to be brought in. For evacuation or for introducing protective gas into this interior space, the interior space of the receiving container is connected by means of at least one conduit at a location that is higher than the highest filling level in the receiving container, with this conduit being attached to a suction pump for a gas-forming medium or to a pump for a protective gas, and to the sluice an additional conduit leading to the pump is attached. Such a device makes it possible to ensure especially drying and heating without decomposition reactions of the polyester. The receiving container is appropriately provided with a shredder knife, an agitator blade, or a stirring beam, which can also be sealed gas-tight to the inner space of the container. In addition, the feed opening of the shredder is also designed to be gas-tight to the extruder cylinder. In practice, this device has also proven itself.

A further possibility to prepare plastic mixtures is described in WO 01/68345, namely a procedure for transfer molding of plastic mixtures, especially plastic mixtures having at least one polyester and at least one modifier component, especially recyclates of same, as well as a device for carrying out this procedure which permits processing of such plastic mixtures while largely maintaining the material properties, and which makes known improvements in material properties of such plastic mixtures usable to the fullest extent. Especially if the melting points of one or more of the modifier components are close to the drying temperature for the polyester component in the receiving container, by this means, possible backups or agglomerations in the preparation device are prevented.

The thermoplastic polyester component or the PET mixture in the initial state is heated and dried in a pretreatment station, analogous to EP 390 873. Then the heated and dried PET component is released to a plastification unit and at least one modifier component is added in. The mixture of thermoplastic polyester component and modifier component is homogenized in the plastification unit and is brought out as a melt into an injection unit and then injected into an opened extruder die.

Processing of a plastic material in an injection molding unit essentially depends on the various parameters or properties of the material fed to the injection molding unit, especially on its viscosity, crystallinity, molecular breakdown, orientation in the surface layer, on possible anisotropies, etc. All these parameters are decisively influenced by the type of processing or preparation of the materials before the plastification or before the melting. But also the kind of melting and the kind of injection process affect the end-result quality of the end product. In this regard, practical and commercial aspects such as cycle times, etc. are to be taken into account.

Especially when we are dealing not with end-product items manufactured in this way, but rather, for their part, with intermediate products that, for example, still have changes in shape to undergo, such as preforms, it is advantageous for these products to be of high quality.

SUMMARY OF THE INVENTION

Thus it is a task of the present invention to produce a procedure by which, using an injection molding procedure, plastics can be further processed into high-value end products or intermediate products such as preforms, in a careful, efficient and cost-effective manner. Additionally, a device suitable for this is to be produced.

Surprisingly, it has been shown that due to the invention-specific procedure and this device it has been possible to also carefully process sensitive or unstable plastics, especially hygroscopic ones, or plastics with a high moisture content. Besides that, also plastics to be recycled, especially polylactic acid (PLA), regardless of their type, shape and composition, can be dried and simultaneously crystallized if necessary in one step. Additionally, plastics can be subjected to a speedy and optimally energy-saving recycling, with the recycled, reclaimed end products or items manufactured by injection molding exhibiting high viscosity values, and especially exhibiting a viscosity that is comparable with the viscosity values of the material to be recycled. In addition, using this procedure, especially with vaporizable substances, severely soiled or contaminated or heavily compressed plastics are processed, with no negative effects on the mechanical properties of the plastic and/or its melting properties.

The recycled, reclaimed plastics or the attained plastic melts or the injection-molded articles manufactured from the melt are of foodstuff-packaging quality; i.e. they meet the foodstuff requirements, and are suitable for use for foodstuffs, and are certified as per the European LSI document or the FDA. In the raw material submitted, harmful substances, migration products and contamination are eliminated as much as possible using the procedure.

Thus, with the advantageous procedure, products, especially preforms, with high-value properties are obtainable by means of a simply designed and fast-operating device.

The invention-specific process is a two-stage one, and first comprises a pretreatment or preparation of the thermoplastic raw material, and then further processing of it in an injection molding device. More simply put, a special preparation container in which the raw material is pretreated is attached to a specially configured injection molding machine, by which only specially prepared material with special properties gets into the injection molding machine and is there melted and sprayed into shapes.

The first step of the preparation, processing and recycling of the thermoplastic material in all of its advantageous configurations is normally carried out in a receiving container or reactor. The plastic material to be treated is presented in this receiving container or reactor and treated at an elevated temperature while constantly being mixed, moved and/or comminuted.

For mixing and heating of the plastic material, at least one comminution machine or mixing tool that can be rotated about a vertical axis is placed if necessary at several levels lying one above the other, with working edges that act in comminuting and/or mixing fashion on the material. Using this comminuting or mixing tool, the polymeric material is impinged on by mechanical energy, causing the polymeric material to be heated and simultaneously mixed. The impinging mechanical energy is transformed to effect the heating.

Gentle but constant motion of the polymer material is advantageous. By this means, the material is prevented from agglomerating or becoming matted in the critical temperature range until sufficient crystallization of the surface of the particles prevents the individual particles themselves from sticking together. In addition, due to the motion, a higher processing temperature is possible. In addition to hindering sticking by the gentle and constant motion in the treatment container, at the same time care is taken that the temperature in the container becomes or remains sufficiently high, and every particle is carefully heated to the appropriate temperature or maintained at it. At the same time, due to the motion, the migrating molecules are given support as they detach from the surface of the particles. For this purpose, advantageously tools are used at various levels with continuous processes, or mixing tools with batch processing.

Such reactors are also used in practice and are known, for example, as the Erema Plastic Recycling System PC or as one- or two-stage Vacurema facilities.

Processing occurs at a temperature below the melting temperature and preferably above the glass transition temperature of the plastic material, with the polymeric material being evenly and constantly moved and mixed. By this means, the plastic material is crystallized, dried and cleaned in one step.

Plastic materials used for treatment are primarily polylactic acid (PLA), high-density polyethylene (HDPE), low density polyethylene (LDPE), polypropylene (PP), polycarbonate (PC), polystyrene (PS), polyethylene naphthalate (PEN), polyamide (PA), polyimide (PI), polyhydroxyalkalinic acid (PHA), styrene copolymers such as acrylonitrile-butadiene styrene (ABS), styrene acrylonitrile (SAN), polymethylmethacrylate (PMMA) and/or bioplastics, especially those based on starches or starch blends. Also, mixtures of these plastic materials, such as PET-PE, PET-Pa or PP-PA, are used.

Usually the plastic material is present in the form of at least partially crystallized or non-crystallized or amorphous granulates, as virgin material or as a regenerate. However, it can also be rather in the form of amorphous, comminuted foil refuse, especially from deep-drawing applications, with a thickness in particular between 100 µm and 2 mm, in the form of thin foil refuse from drawing facilities with a thickness especially between 5 µm and 100 µm and/or in the form of fiber or fleece refuse. In addition, the plastic material may be in the form of broken bottles or injection molding wastes.

The exact procedural parameters, especially temperature, are guided according to the shape and thickness of the material, and also of course as per the type of polymer.

The procedure is preferably carried out for lumpy polymeric material, especially in the form of granulates, flakes or the like, in a one-stage Vacurema reactor. Such a reactor has the features indicated above, and can be subjected to a vacuum.

For polymeric material in the form of thin foils, fibers or fleeces, the procedure is advantageously carried out in a one-stage Erema PC reactor. With this it often suffices if the procedure is carried out at ambient pressure, i.e. with no vacuum. The reactor also has the features mentioned above.

The procedure can also be carried out in two stages. Thus for example a mixture of crystalline and non-crystalline granulates or flakes can be submitted as material to be cleaned in the crystallization drier of a two-stage Vacurema reactor. In the crystallization dryer placed upstream, comminution or mixing tools are placed that rotate about a vertical axis, which are equipped with working edges that act in comminuting and/or mixing fashion. Due to these comminution or mixing tools, the material is impinged on by mechanical energy, causing the material to simultaneously be pre-heated, mixed and moved. Then the pre-heated, pre-dried and pre-crystallized material undergoes the main treatment.

To carry out the first step of the invention-specific process in advantageous fashion, for example a device can be used that has a container for the plastic product to be processed, to which this product is fed through an insertion opening and from which the product is carried out through a worm gear attached to the side wall of the container, with a tool being placed in the bottom area of the container that can turn at least about a vertical axis, with working edges that act in comminuting and/or mixing fashion on the product, and with the insertion opening of the worm gear lying at least approximately at the level of the tool, and preferably equipped with at least one conduit attached to the container to generate a vacuum and/or for treating the interior of the container with gas. Such a device is for example implemented as a Vacurema reactor or as an Erema PC reactor.

Running the procedure in such a way is generally satisfactory, even when processing types of plastic that are sensitive to atmospheric oxygen and/or moisture, since evacuation of the container or injection of a protective gas into the interior of the container can protect the plastic material against these damaging influences.

However, it has been shown that in some cases the plastic material drawn into the worm gear is not sufficiently homogenized, especially in regard to the degree to which such plastic materials have been dried, which must be completely dry before plastification to avoid degradation.

Foils of greater thickness require expenditure on drying that increases with increasing thickness, and therefore for such products special drying processes, such as with dehydrated air, are necessary in special dryers. In addition, these dryers operate in a temperature range at which only a crystallized product is permitted; amorphous products would become sticky and agglomerate.

This means that a crystallization step must be placed prior to the drying process. However, if the product to be processed is given lengthy processing by the tool in the container, then especially with continuous operation, the device is subject to the danger that individual plastic particles are collected very early by the removal worm gear, while other plastic particles are very late. The plastic particles collected early can still be relatively cold and therefore not pretreated sufficiently, causing inhomogeneities to arise in the material fed to the injection molder.

To avoid this, and to substantially improve the homogeneity of the removed material, the invention-specific procedure can be run in an additional device, in which the removal opening of at least one additional container can be attached to the insertion opening of the main container, in which [additional container] a tool is likewise provided that rotates about a vertical axis in the bottom area of the container. Thus, two or more containers are placed in series, and the plastic material to be processed has to run through these containers in turn. In the first container, already pre-comminuted, pre-heated, pre-dried and pre-condensed and thus pre-homogenized material is generated, which is released to the following container. This ensures that no untreated (i.e. cold, uncondensed, non-comminuted and inhomogeneous) material passes directly to the removal worm gear or into the injection molder or via the removal worm gear to the attached extruder or the like.

These advantages are also ensured if the thermoplastic material is subjected to a vacuum or treated with a protective gas in the second container or one following it. The overflow cross section as a rule is small and material transport strongly throttles the pressure equalization. In addition, the mixing clot formed in the upstream container covers the removal opening of this container, and therefore likewise seals it to a certain extent.

Conditions are especially favorable if the removal opening of the additional container, thus the upstream container, is at least approximately at the level of the tool in this container, thus in the bottom area of the container. The tool rotating in this container then uses centrifugal force to feed into the removal opening, so that the overflow cross section is always well-filled with material.

According to an advantageous further development, the removal opening is connected with the insertion opening by means of a connecting pipe in which a locking device is placed. By this means, a complete sealing can be achieved between the two containers, so that losses of vacuum and protective gas are completely avoided. In the simplest case, this locking device according to the invention can be a slider that is closed as soon as vacuum treatment or gas treatment has taken place in the downstream container. It is true that by this means, no completely continuous operation is possible. However, if, according to a preferred embodiment form of the invention, the locking device is a sluice, especially a cellular wheel sluice, then the referred-to seal between the two containers is maintained, and continuous operation is nonetheless possible. The cells of the sluice can likewise be evacuated or gas-treated in a manner known per se.

The vacuum formed in the downstream container supports inspiration of the product to be processed from the upstream container. Therefore, as a rule, with such units, the containers can be placed at the same level. But if we wish to improve filling of the downstream container using gravity, then according to a further development of the invention, the arrangement can be made so that the upstream container in the direction the product is flowing is higher than the following container. Therefore, the latter can be loaded also in the center area or in the upper area of its side wall and if necessary also through the cover.

As described, this first procedural step can also be carried out in advantageous fashion in two stages in a device appropriately configured for this. With this running of the procedure, the arriving or fed product undergoes a two-stage treatment, whereby, in the course of the pretreatment in the pretreatment device, the product is not plastified, but rather crystallized and/or subjected to a certain pre-densification with simultaneous drying. The product is pre-densified at an appropriate temperature by mechanical impingement with simultaneous drying. In particular, the at least one mixing and/or comminution device raises or adjusts the temperature via mechanical impingement of the product or via conversion of rotational energy into thermal energy due to friction losses that appear.

During the main treatment in the main treatment device, the product is further dried, detoxified and if necessary crystallized at an elevated temperature, and kept at high vacuum for a specific average dwell time. In turn, the at least one mixing or comminution device mechanically impinges on or densifies the material and inserts energy, which, due to its rotation, inserts the corresponding thermal energy into the product and further warms it.

The main treatment, which is done under vacuum, reduces the residual moisture to a preset specific average value and also causes volatile pollutants to be removed from the product.

During the main treatment, the temperature is kept below the melting temperature of the product. However, an effort is made to set this temperature as high as possible.

The devices described precisely and specifically in the publications EP 123 771, EP 390 873, AT 396 900, AT 407 235, AT 407 970, AT 411 682, AT 411 235, AT 413 965, AT 413 673 or AT 501 154, along with all their advantageous configurations, are incorporated into the present disclosure and represent an integral component part of the disclosure. Such devices are also used in practice and are known, for example, as the Erema Plastic Recycling System PC or as a one- or two-stage Vacurema unit.

After the plastic material has been prepared or pretreated, the second procedural step of the invention-specific procedure is plastification of the plastic material drawn from the treatment container as well as injection molding in the injection molding device.

The extruder of the injection molder, preferably attached directly to the main treatment device or the cutter-compactor, carries out the plastification. Due to the direct, vacuum-tight attachment, the vacuum can exert an effect into the entry area of the extruder in the main treatment device. Often the extruder has a plastifier zone to which a compression and retaining zone are adjacent. To this retaining zone, a degassing or evacuation zone can be adjacent, in which, using vacuum, especially high vacuum, volatile substances are removed by suction from the melt. With this, a one-stage or multiple-stage degassing can be provided; also, several compression and decompression zones can be placed to follow one another with differing degrees of vacuum. With this, even stubborn and hard-to-vaporize contaminants can be evaporated.

By appropriately selecting the temperature and dwell times in the pretreatment and in the main treatment, the viscosity values of the melts removed from the extruder and injection-molded products manufactured from the melt can be adjusted. Via appropriately long dwell times and appropriately high temperatures in vacuum, a positive effect can be exerted on the viscosity, or repolymerization can occur.

Injection molding machines are known as piston injection molding machines, worm gear-piston injection molding machines or as worm-gear injection molding machines. Until 1956 principally piston injection molding machines were used. Worm gear-piston injection molding machines that are currently common mainly withdraw plastics in the form of a granulate from a hopper into the worm channels, reduce them to pieces and cut them. The frictional heat thus generated, linked with the heat fed from the heated cylinder, ensures a relatively homogeneous melt. This collects in front of the tip of the receding worm. In the injection phase, the back side of the worm is pressurized hydraulically or by mechanical force. With this, in contrast to transfer molding, the melt is compressed under high pressure (mostly between 500 and 2000 bar) through the non-return valve; through the nozzle compressed onto the injection molding tool; and if necessary through a heating-channel system (customary in modern mass-production tools) and the gating channel into the shaping cavity of the temperature-controlled injection molding tool. A reduced pressure acts as a holding pressure on the melt until the attachment (gating) has congealed (stiffened). By this means, the volume shrinkage that occurs during cooling is largely compensated for. By this measure, the dimensional accuracy and the desired surface quality are achieved. After that, the worm begins to rotate. While the shot mass in this manner is prepared for the following preform, the preform in the tool is still cooling off until the heart (liquid core) has solidified. The tool opens and ejects the completed preform.

Plastification of the granulate due to the turning motion of the worm—supported if necessary by the exterior heater bands—ensures a very homogeneous temperature distribution. As stated, the worm itself performs the injection by turning axially. By this means, the worm also assumes the function of a piston. The high quality of the preforms, short cycle times, and the possibility to manufacture large preforms are advantageous.

The closing unit must hold the divided injection molding tool against the action of spraying pressure and holding pressure. After the residual cooling time has elapsed, it must open the form and close again after ejection of the completed preform. For the most part the closing unit contains auxiliary devices (ejectors) for better removal of the completed part.

All the relevant processing parameters are set by means of the controls. At the same time they assume the entire monitoring of the process during the manufacture that occurs by automatic operation.

The procedural sequence of injection molding can in essence be divided into:
a dosing and plastification process
injection and holding pressure up to the sealing point
cooling process
removal process.

The melt is injected mostly by hydraulic feed motion of the worm, which has an annular non-return valve before the nozzle, so that the melt cannot be compressed back into the worm-gear channels due to counterpressure. This feed motion is governed, resulting in a certain melt flow "injection flow". The injection flow can mostly be adjusted to various levels in several sections, thus producing the "injection flow profile".

In principle the melt is injected as quickly as possible into the mold cavity, with the injection flow in fact needing to be kept within boundaries to avoid material damages. Depending on the viscosity of the melt, a pertinent form-filling time can be roughly computed for certain injection volumes from the ideal injection flow, which are pre-set in tabular form and can be consulted as the control value in a specific case.

This injection flow can only be implemented if sufficient hydraulic pressure has been applied. The hydraulic pressure should be kept as low as possible for reasons of going easy on the control valve, but suffice to implement the preset injection flow.

The melt injected into the form quickly cools off in the tool and undergoes a shrinkage in volume, which should largely be compensated for by holding pressure. True, the pressure required for this ought not to result in unnecessarily high intrinsic stresses in the component. Also, by conversion at the proper time from injection pressure to holding pressure (at about 98% of form filling), over-injection should be prevented. If namely the full injection pressure is acting in the tool, the tool and closing unit undergo heavy loads, which can result in the separating plane opening somewhat due to excessive internal pressure, and melt can enter the intermediate space ("overinjection", formation of "float membranes").

Due to continuous cooling off of the melt in the tool, at locations where the wall is thin, especially at the spray point, sometimes the melt can freeze, so that from holding pressure no more melt can be transported into the cavity. At this point the holding pressure can be shut off.

When the preform weight no longer is changing, the sealing point has been reached, i.e. the maximum required holding pressure time and/or the required holding pressure. To avoid intrinsic stresses, in favorable fashion no constant holding pressure is applied, but rather a holding pressure profile, which starting from the highest holding pressure is lowered in two or three stages.

The injected melt is prepared in the worm antechamber, before the non-return valve. The granulate is plastified in the spraying unit by a combination of thermal convection over the heated cylinder walls and frictional heating that is generated by the turning of the worm. Worm rotation causes the molten mass to be transported into this worm antechamber, with the worm withdrawing as pressure arises in the worm antechamber, as it builds up due to transport.

Thus the melt has improved homogeneity due to increased worm friction, for example by action of a counterpressure ("banking-up pressure") that is applied to the worm or due to an increase in worm r.p.m. (peripheral velocity).

Too great a worm friction mechanically loads the melt, which can cause the plastic to decompose, and therefore it must be limited. As a guideline, a maximum peripheral velocity of 0.2 to 0.3 m per second is indicated. If the peripheral velocity cannot be directly inputted into the machine controls, the pertinent worm r.p.m. can be read out from illustration 14.

To provide support to uniform melting, usually a pressure of 40 to 150 bar is set. With shorter worms—the length-thickness ratio is crucial—the banking-up pressure must always be selected to be somewhat higher than with longer worms, which from the outset permit a more uniform heating and homogenization. Customary worms have a length-thickness ratio between 18 and 22.

The injection-molded article must be sufficiently cooled to be removed. The removal temperatures depend on materials and are prespecified by the material supplier. In any case, after removal, the parts must not exhibit any disadvantageous warping or plastic deformation due, for example, to the injection pins.

The cooling time required for this is made up of the dosing time and the residual cooling time. Ideally the dosing time suffices for cooling to the removal temperature. However, often a residual cooling time must be provided, which correspondingly extends the cycle time.

What are essential for the cooling time are the tool temperature, the mass temperature upon injection, the tool material (thermal conductivity), the type of plastic (thermal conductivity and heat transmission), and the wall thickness of the injection-molded item. Wall thickness has the largest effect overall. The cooling time can be read out depending on the wall thickness for a certain material from diagrams from the manufacturer of the material.

With the present advantageous combination of these two separate procedural steps and with the two separately configured devices coupled together, high-valued products can be simply obtained.

What is advantageous is the combination of a continuously running cutter-compactor with a non-continuously running axial worm-gear injection molding device, with the cutter-compactor advantageously attached directly, immediately and with no intermediate stage to the injection molding device.

With preparation of plastic material in which, as in the invention-specific case, the material is not merely loosely missed, but also heated, and, as provided by embodiments described herein, able to be put into an adherent, soft, but nonetheless lumpy state, the polymer material pre-treated in this manner cannot be inserted into the worm-gear injection molding unit via an open hopper loosely and in free-flowing fashion. Precisely in worm-gear injection molding devices, the feeding is crucial, among other things for an optimal procedural guidance, since plastic materials pre-treated in this fashion exhibit high packing density as compared to non-pretreated flakes.

Thus, it is required that pre-processed and prepared polymer material be delivered and compressed from the cutter-compactor directly and immediately via force-feeding into the entry area of the worm-gear injection molding device, to attain the desired degree of filling. By this means it is possible also to process sensitive or unstable plastics, such as hygroscopic ones, or plastics with an increased moisture content, carefully and with the quality maintained, since it is precisely in this softened and heated state that the lumpy plastic particles with an increased surface are very susceptible to oxidation or hydrolytic decomposition processes.

Through this force feeding or the direct, immediate combination or the direct and immediate attachment of the cutter-compactor to the injection molding device, the prepared material, due to the motion in the cutter-compactor evoked by the mixing tools, is forced in the direction of the injection molding device, thus attaining a higher degree of filling in the insertion area of the injection molding housing, because the softened flakes have a higher packing density than flakes that have not been pretreated. This, for one thing, results in the worm gear of the injection molding device being able to be configured shorter, and this results in shorter injection molding cycle times, and the entire process can as a further consequence go faster.

Primarily, such combined devices in practice are used for manufacture of new PET bottles from old PET bottles. The process is run roughly like this: used PET bottles to be recycled are delivered, thoroughly cleaned beforehand if necessary, and then brought into the cutter-compactor. To eliminate contaminations and bothersome smells, etc. from the material, and also to maintain the quality of the PET material, which is known to be sensitive to humidity, or even if necessary to improve it by increasing viscosity, it is necessary to carry out an appropriate reprocessing or preparation. As a rule, simply mixing and comminuting PET bottles is insufficient. While reprocessing, among other things, the temperature rises and the polymeric materials are brought into a softened but still lumpy state, and kept in that state for a certain dwell time. Only by this means can it be ensured that, as mentioned above, the resulting end product is appropriate for use with foodstuffs and meets the qualitative requirements.

It is precisely when manufacturing mass goods like PET bottles or the like that the manufacturing time per bottle is crucial to the efficiency of the facility. Manufacture time of PET bottles in standard facilities runs in the range of about 8 to 10 seconds per bottle. As mentioned, such PET bottles are often produced by injection molding processes.

Due to the invention-specific combined unit it is now possible to lower the production time required for one bottle by somewhat more than 2 seconds, which means a time savings of a good 20%. It is precisely for mass-produced goods that small accelerations of the procedure are crucial and result in substantial savings.

By having the worm gear inject the melt that collects in a retaining space directly under high pressure, due to its shifting axially, into an injection molding form or by the worm that acts or is configured as a (high) pressure-generating piston, a cost-effective and simple procedure is created.

By having the worm gear press the melt by its axial shift at low pressure into a shooting pot spatially separated from the housing, but in fluid connection with it, or by the melt being injected therefrom by a piston that especially can be hooked up independent of the worm gear, under high pressure, into an injection molding form, or through such a device with a structurally separated shooting pot, throughput is increased by shortening the cycle time.

By the material undergoing all the processing steps or being pretreated or prepared and/or transferred and/or injected in a vacuum or a protective gas, it can be prevented from decomposing by oxidation or hydrolysis.

In this regard it is especially advantageous to make simple structural provision that the housing has an insertion opening with which it is attached to an output opening of the receiving container, for example radially or tangentially, especially directly, and preferably in gas-tight fashion or in a vacuum, with the removal opening preferably placed in the side wall close to the bottom area of the receiving container, especially at the level of the mixing tool.

In addition, it is advantageous to provide at least one melt filter between the worm and the injection molding form, and/or that the worm-gear injection molding device comprise a back-run safety device, especially in the form of a non-return valve placed between the shooting pot and the worm and/or in the channel.

Additionally advantageous is that the receiving container be in continuous, and the worm-gear injection molding device be in non-continuous operation.

BRIEF DESCRIPTION OF THE DRAWINGS

The invention is described in exemplary fashion without limitation by the following advantageous embodiment forms.

DESCRIPTION OF THE PREFERRED EMBODIMENTS

Figure 1:
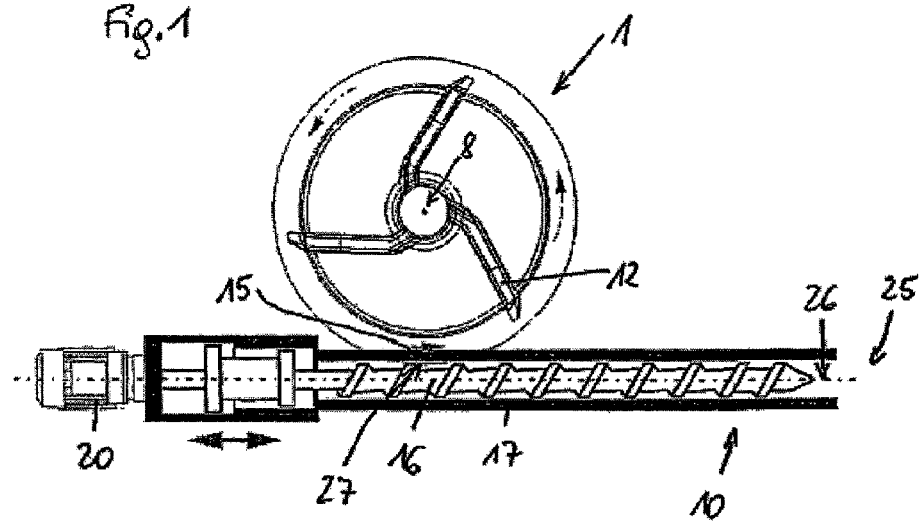
FIG. 1 shows a first embodiment form of the invention-specific device without a shooting pot.

The device according to FIG. 1 essentially comprises a reactor or cutter-compactor 1 and a worm-gear injection molding device 10 that is attached to it directly, especially under vacuum, depicted in part and likewise described previously in detail. With this advantageous combination, preforms can be manufactured from plastic materials such as from PET materials, for example flakes.

For mixing and heating the plastic material, in reactor 1—this reactor or cutter-compactor 1 and its manner of operation was already described above in detail, to which reference is made here—a comminution or mixing tool 12 is placed that turns about a vertical axis 8, with working edges that act so as to comminute and mix the material. Using this comminution and mixing tool, the polymeric material submitted in cutter-compactor 1 is mixed and impinged on by mechanical energy, resulting in the polymeric material being heated, but not melted, and simultaneously mixed and moved. The treatment takes place in a vacuum. Such means ensure that hygroscopic materials such as PET, PLA, etc. are dried, and also amorphous materials such as PS are possibly crystallized. Also detoxification or decontamination are achieved. Also the limit viscosity can be increased by charging of the reactor 1 with pre-dried PET flakes, for example in a two-stage system. After this pretreatment, the material is charged into the worm-gear injection molding device 10.

Figure 2:
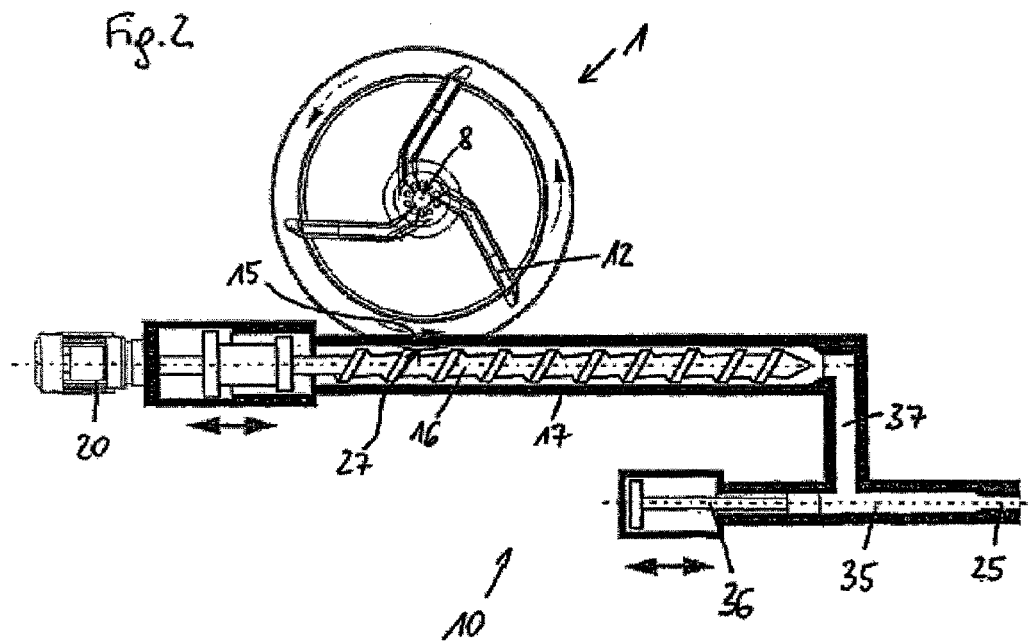
FIG. 2 shows a second embodiment form of the invention-specific device with a shooting pot.

The injection molding device attached to cutter-compactor 1 is a so-called worm-gear injection molding device 10. It and its method of operation were already described previously in detail, to which reference is made here. The worm-gear injection molding device 10 comprises a worm gear 16 that is supported in a housing 17. In FIG. 1, an embodiment form with no shooting pot 35 is depicted, while FIG. 2 shows an embodiment form with a shooting pot 35. The catchment opening 27 of worm gear 16 lies roughly at the level of mixing tool 12 or at the distance of mixing tool 12 from the base, and preferably is equipped with at least one line attached to cutter-compactor 1 to generate a vacuum and/or for gas treatment in the interior container space. Catchment opening 27 is tangential, gas-sealed or under vacuum and attached directly to a removal opening 15 of receiving container 1. In addition, the housing 17 of worm gear 16 is designed to be gas-sealed in the direction of drive 20. In the direction of the injection-molded form, the melt does the sealing.

Generally, injection molding machines consist of two pieces, namely the spraying and plastifying unit, which prepares the plastic granulate and injects it under pressure into the tool, and the closing unit which admits the tool and opens and closes it. In FIGS. 1 and 2, only the spraying and plastifying unit is shown.

The interior diameter of housing 17 is equal to the exterior diameter of worm gear 16. The cutter-compactor 1 is placed in the rear area of housing 17. The worm 16 is driven by motor 20.

Through the catchment opening 27, the pre-treated material, heated or softened but still lumpy, gets into housing 17. Turned by drive 20, the worm 16 rotates in housing 17 and transports the material forwards. With thermoplastic injection molding, the housing is heated from outside if necessary by electrical heat tapes. Due to this heat and the special geometry of worm 16, the granulate is not merely fed, but also cut, with the plastic being melted, plastified and homogenized.

At the tip of the housing there is a nozzle 25, not shown in FIG. 1, which forms the transition to the tool.

In the course of the dosing process, the melted molding material is mostly transported through a non-return valve that possibly is present to nozzle 25, and banks up in front of it in a retaining area 26. To offer sufficient banking-up space for the molding material, the worm 16 is impinged on axially by only slight pressure (banking-up pressure), so that it can shift backwards in the direction of cutter-compactor 1 and motor 20 (see arrows), and thus the so-called worm antechamber 26 forms between the non-return valve and nozzle 25, in which the mass volume is found. The banking-up pressure acts against that melt, so that the melt becomes condensed, and does not pull worm 16 back. The pressure that the melt exerts moves worm 16 back.

In the following injection process, worm 16 is pressed axially toward nozzle 25, whereupon the non-return valve locks, and thus the mass volume is sprayed through nozzle 25 into the tool.

The worm-gear injection molding device 10 thus operates in discontinuous fashion, and, in contrast to FIG. 2, has no shooting pot 35.

This embodiment form represents a simple and cost-effective design. If necessary, filters can also be provided for filtering of the melt.

FIG. 2 shows an additional embodiment form which ensures a higher throughput. With it, the molten material is compressed from the worm 16 out of the housing 17 through a channel 37, equipped if necessary with a non-return valve, into a shooting pot 35 placed upstream, and from there, via a piston 36 acting independently of the worm, sprayed under high pressure through nozzle 25 into the form.

In this case the injection time for generation of melt in the nozzle is exploited, by which the cycle times are curtailed.

In both instances, the cutter-compactor 1 operates continuously and the injection molding extruder 10 discontinuously. Devices for filtering the melt can also be provided.

The invention claimed is:

1. A method for injection molding of plastic material, with the plastic material initially present in the form of lumpy or particle-shaped polymer particles or flakes, comprising:

pretreating the plastic material by heating and softening the plastic material in at least one continuously-driven cutter-compactor while mixing the plastic material at a temperature below a melting temperature of the plastic material, with at least one comminution or mixing tool, the tool comprising working edges that act so as to comminute and/or mix the plastic material, wherein the cutter-compactor further comprises a removal opening;

subsequently, while the plastic material is still lumpy, transferring the plastic material directly and immediately into a worm-gear injection molding device attached directly and immediately to the cutter-compactor, the injection molding device comprising a worm gear, rotatable in a housing and able to be shifted axially therein and acting as a piston;

plastifying the plastic material within the injection molding device; and spraying the plastic material into a shaped piece;

wherein the transferring the plastic material comprises compressing the plastic material by force-feeding through motion of the tool, and bringing the tool into abutment with the removal opening to directly force feed the plastic material through the removal opening and into a catchment area of the worm-gear injection molding device, wherein the catchment area is immediately adjacent the removal opening.

2. A method according to claim 1, wherein the spraying comprises the worm gear injecting the plastic material by axial displacement of the worm gear, directly under high pressure into an injection mold.

3. A method according to claim 1, wherein the spraying comprises the worm gear compressing the plastic material by axial displacement of the worm gear, at low pressure, into a shooting pot that is spatially separated from the housing but in fluid connection with the housing, and injecting the plastic material at high pressure from the shooting pot via a piston into an injection molding form.

4. A method according to claim 1, comprising performing at least some of the method in a vacuum or protective gas.

5. A method according to claim 1, further comprising filtering the plastic material in the worm-gear injection molding device.

6. A method according to claim 1, wherein the heating comprises impingement of the material with mechanical energy via the tool.

7. A method according to claim 1, further comprising at least one of crystallizing, drying, and cleaning the material in the cutter-compactor or raising a limit viscosity of the material simultaneous with the heating.

8. An apparatus for injection molding of plastic material, comprising:

at least one continuously operable cutter-compactor that is essentially cylindrical and has a floor area and a side wall, with at least one mixing or processing tool placed therein, the cutter-compactor being configured to pretreat the plastic material by mixing, heating, and softening the plastic material; and a worm-gear injection molding device attached directly to the cutter-compactor, wherein the worm-gear injection molding device comprises a worm gear in a housing, configured to transport the material from the cutter-compactor, and to subsequently plastify the material, wherein the worm gear is supported so as to slide axially in the housing and act as a pressure-generating piston for the plastic material;

wherein the housing of the worm-gear injection molding device comprises a catchment opening attached directly, immediately, and with no intermediate stage, to a removal opening of the cutter-compactor, and wherein the tool, the removal opening, and the worm-gear injection molding device are configured such that the plastic material can be compressed in by means of force-feeding into the catchment opening of the worm-gear injection molding device, wherein the tool is configured and dimensioned to abut the removal opening to directly force feed the plastic material through the removal opening and into the catchment opening.

9. The apparatus according to claim 8, wherein the housing is attached radially or tangentially to the removal opening of the cutter-compactor in gas- or vacuum-tight fashion, with the removal opening disposed in the side wall near the floor area of the cutter-compactor at the level of the tool.

10. The apparatus according to claim 8, wherein the worm gear is configured to inject the plastic material collected in a retaining space in front of a nozzle by axial shifting of the worm gear under high pressure directly through the nozzle into an injection mold.

11. The apparatus according to claim 8, further comprising a shooting pot that is disposed behind the housing, and is fluidly connected with the housing by a channel, wherein the worm gear is configured to compress the plastic material at low pressure, by axial displacement of the worm gear, into the shooting pot, the apparatus further comprising at least one piston disposed in the shooting pot, configured to inject the plastic material out of the shooting pot at high pressure into an injection molding form.

12. The apparatus according to claim 11, wherein the worm-gear injection molding device further comprises at least one non-return valve, disposed in at least one location selected from between the shooting pot and the worm gear, and in the channel.

13. The apparatus according to claim 8, further comprising at least one melt filter disposed downstream of the worm gear.

14. The apparatus according to claim 8, wherein the tool is configured to rotate about a vertical axis.

* * * * *